(12) United States Patent
Kitamaru

(10) Patent No.: US 8,078,627 B2
(45) Date of Patent: Dec. 13, 2011

(54) FILE MANAGEMENT APPARATUS, METHOD FOR CONTROLLING FILE MANAGEMENT APPARATUS, COMPUTER PROGRAM, AND STORAGE MEDIUM

(75) Inventor: Yoshinobu Kitamaru, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 11/855,554

(22) Filed: Sep. 14, 2007

(65) Prior Publication Data

US 2008/0091749 A1    Apr. 17, 2008

(30) Foreign Application Priority Data

Oct. 16, 2006  (JP) ................................. 2006-281736
Sep. 6, 2007   (JP) ................................. 2007-231883

(51) Int. Cl.
*G06F 7/00*    (2006.01)
*G06F 17/30*   (2006.01)
*G06F 13/14*   (2006.01)

(52) U.S. Cl. ...................... 707/752; 707/705; 707/736

(58) Field of Classification Search ... 707/3, 101–104.1, 707/200, 999.001–999.006, 999.101–999.107, 707/752, 99.001–99.007; 706/16; 348/187, 348/207.1–207.3, 231.2–231.3, 333.05; 715/835, 715/760

See application file for complete search history.

(56) References Cited

U.S. PATENT DOCUMENTS

| | | | |
|---|---|---|---|
| 6,970,265 B2 * | 11/2005 | Ho | 358/1.16 |
| 7,505,065 B2 * | 3/2009 | Oura et al. | 348/207.1 |
| 2002/0060740 A1 * | 5/2002 | Kato | 348/232 |
| 2004/0117411 A1 * | 6/2004 | Ueda et al. | 707/200 |

FOREIGN PATENT DOCUMENTS

| | | |
|---|---|---|
| JP | 2005-115998 | 4/2005 |
| JP | 2006-086709 A | 3/2006 |
| WO | 2005/029313 A | 3/2005 |

OTHER PUBLICATIONS

The above references were cited in a Feb. 2, 2009 Russian Office Action that issued in Russian Patent Application No. 2007138224, of which is enclosed with English Translation.

* cited by examiner

*Primary Examiner* — Cam Y Truong
*Assistant Examiner* — Cecile Vo
(74) *Attorney, Agent, or Firm* — Cowan, Liebowitz & Latman, P.C.

(57) ABSTRACT

In order to read data from an external storage medium and automatically sort the data into a plurality of folders to manage the data, a plurality of files sorted into a plurality of folders are read from a plurality of external storage media, file attribute information of the files is extracted, and the read files are sorted into a plurality of folders based on the extracted file attribute information and stored in a storage unit.

4 Claims, 15 Drawing Sheets

FIG. 13

```
<dict>
    <key>Photo Disk 2005</key>         1301
        <dict>
            <key>Family</key>         1302
                <dict>
1303             <key>200606</key>
                    <dict>
        1304        <key>File Name</key>
                        <string>IMG_001.jpg</string>
            1305    <key>File Path</key>
                        <string>d:\picture\Family\20060626\IMG_001.jpg</string>
            1306    <key>File Type</key>
                        <string>Image</string>
                    </dict>
                </dict>
        </dict>
</dict>
```

`US 8,078,627 B2`

FILE MANAGEMENT APPARATUS, METHOD FOR CONTROLLING FILE MANAGEMENT APPARATUS, COMPUTER PROGRAM, AND STORAGE MEDIUM

BACKGROUND OF THE INVENTION

1. Field of the Invention

The present invention relates to a file management apparatus that sorts a plurality of files into a plurality of folders to manage the files, a control method for the file management apparatus, a computer program, and a storage medium.

2. Description of the Related Art

In recent years, personal computer (hereinafter "PC") users have been faced with the need to manage large numbers of files. Further, users are required to manage data in different formats, such as image data, music data and document data.

In order to store and manage large volumes of data, users store data temporarily recorded on the PC's hard disk drive to removable storage media such as CD-ROM or DVD-ROM. For example, with Microsoft Windows (registered trademark) XP, it is proposed that image data be stored to CD-ROM.

In order to easily retrieve data recorded on CD-ROM, it is proposed in the case of image data captured with a digital camera, for example, that data be automatically sorted by the date and time on which it was shot. Further, Ulead Systems WinCDR (registered trademark), for example, implements the proposal that HTML for indexing be created to make data more readily viewable.

On the other hand, a method has been proposed for apparatuses that use random access mass storage media such as optical disks that involves recording captured image data after automatically creating folders which reflect the intentions of the user in response to a user instruction to create folders (see Japanese Patent Laid-Open No. 2005-115998).

Users sometimes rerecord data recorded on a plurality of CD-ROMs to a DVD-ROM, for example. The number of storage media can thereby be reduced, since the capacity of a DVD-ROM is greater than that of a CD-ROM, enabling the user to secure a storage place.

Rerecording data, however, requires much work on the part of the user.

FIG. 15 shows data on a plurality of CD-ROMs 1511 being copied to a new DVD-ROM 1514. Firstly, data 1512 recorded on the CD-ROMs 1511 is written to the DVD-ROM 1514 via the PC's hard disk drive 1515 or the like. In cases such as this, the CD-ROMs 1511 often manage data with their own folder structures. Consequently, data of disparate folder structures is copied to the DVD-ROM 1514, making it difficult for the user to retrieve data to the detriment of usability.

Also, given that even storage media being used for the first time have limited capacity, it is not always possible to store all of the data of the plurality of CD-ROMs 1511 to the DVD-ROM 1514. The user thus needs to take note of the overall size of data stored on the plurality of CD-ROMs 1511, and copy data to the DVD-ROM 1514 after organizing the data to fit onto the DVD-ROM 1514.

In view of the above problems, a feature of the present invention lies in automatically sorting plural sets of data read from external storage media into a plurality of folders to manage the data.

SUMMARY OF THE INVENTION

According to an aspect of the present invention, there is provided a file management apparatus comprising: a reading unit which reads a plurality of files sorted into a plurality of folders from a plurality of first external storage media; a first acquiring unit which acquires a folder structure of each of the first external storage media, wherein the folder structure shows a hierarchy of the folders and a type of file attribute information corresponding to the hierarchy; a selecting unit which selects one of the acquired plurality of folder structures; an extracting unit which extracts the file attribute information from each of the plurality of files; and a storage control unit which sorts, in accordance with the selected folder structure, the plurality of read files into a plurality of folders in a storage unit based on the extracted file attribute information and stores the files on the storage unit.

According to another aspect of the present invention, there is provided a control method for a file management apparatus comprising the steps of: reading a plurality of files sorted into a plurality of folders from a plurality of first external storage media; acquiring a folder structure of each of the first external storage media, wherein the folder structure shows a hierarchy of the folders and a type of file attribute information corresponding to the hierarchy; selecting one of the acquired plurality of folder structures; extracting the file attribute information from each of the plurality of files; and sorting, in accordance with the selected folder structure, the plurality of read files into a plurality of folders in a storage unit based on the extracted file attribute information and storing the files on the storage unit.

According to yet another aspect of the present invention, there is provided a computer program that is stored on a computer-readable storage medium and is for causing a computer to function as: a reading unit which reads a plurality of files sorted into a plurality of folders from a plurality of first external storage media; a first acquiring unit which acquires a folder structure of each of the first external storage media, wherein the folder structure shows a hierarchy of the folders and a type of file attribute information corresponding to the hierarchy; a selecting unit which selects one of the acquired plurality of folder structures; an extracting unit which extracts the file attribute information from each of the plurality of files; and a storage control unit which sorts, in accordance with the selected folder structure, the plurality of read files into a plurality of folders in a storage unit based on the extracted file attribute information and stores the files on the storage unit.

Further features of the present invention will become apparent from the following description of exemplary embodiments with reference to the attached drawings.

BRIEF DESCRIPTION OF THE DRAWINGS

FIG. 13 shows an exemplary structure list according to the embodiment of the present invention.

DESCRIPTION OF THE EMBODIMENTS

The configuration of a file management system that includes a computer apparatus constituting a file management apparatus of the present embodiment will be described with reference to the block diagram in FIG. 1. The file management apparatus may be realized by a single computer apparatus, or by dispersing the functions among a plurality of computer apparatuses according to necessity. In the case where the file management apparatus is constituted by a plurality of computer apparatuses, the computer apparatuses are connected by a local area network (LAN) or the like so as to be able to communicate with each other.

Figure 1:
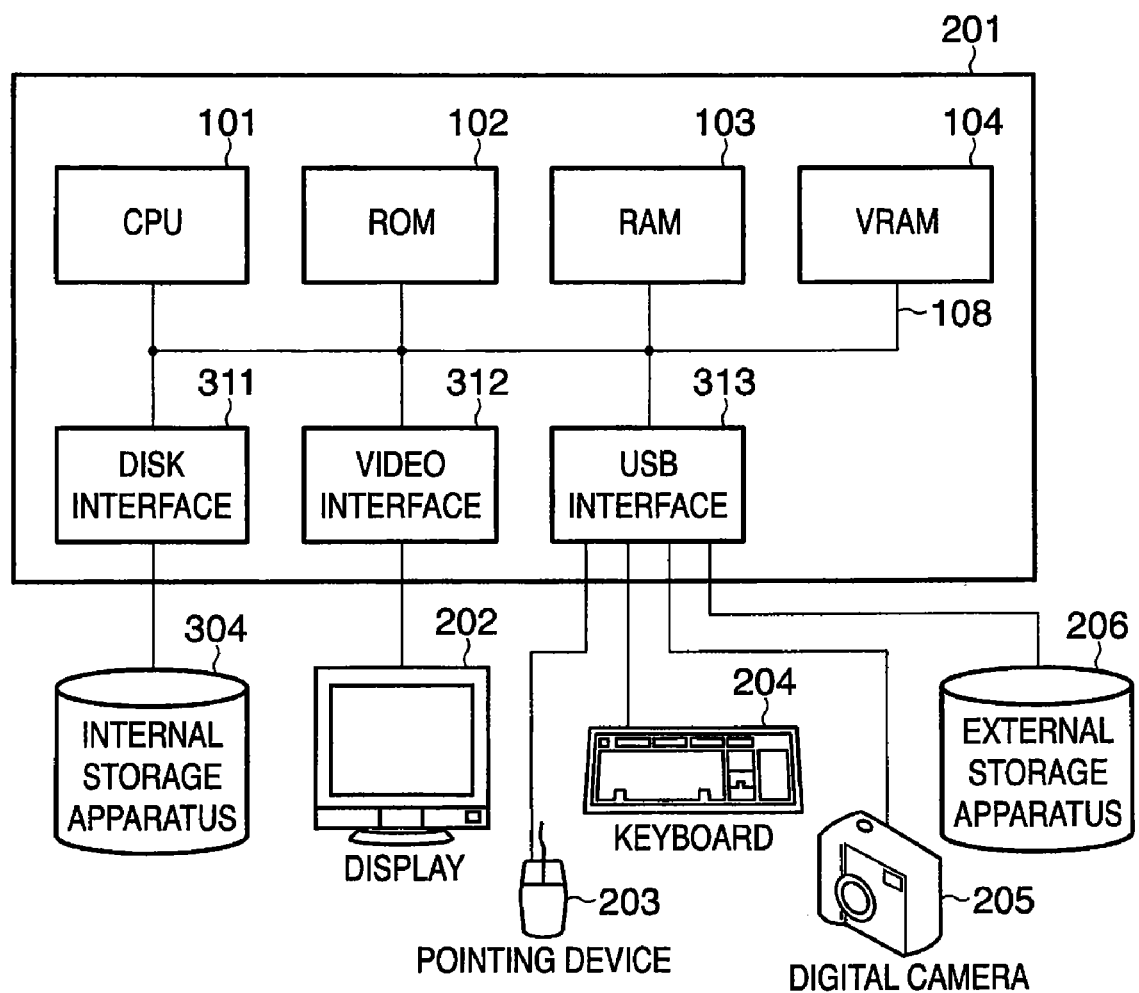
FIG. 1 is a block diagram showing an exemplary configuration of a file management system according to an embodiment of the present invention.

In FIG. 1, reference numeral 101 denotes a central processing unit (CPU) that controls the entire computer apparatus 201. Reference numeral 102 denotes a read only memory (ROM) that stores computer programs and parameters that do not need modifying. Reference numeral 103 denotes a random access memory (RAM) that temporarily stores computer programs and data supplied from external apparatuses or the like. Reference numeral 104 denotes a video RAM (VRAM) that holds data to be displayed on a display.

Reference numeral 304 denotes an internal storage apparatus (storage unit) such as a hard disk drive secured in the computer apparatus 201. Reference numeral 311 denotes a disk interface for connecting to the internal storage apparatus 304. Reference numeral 206 denotes an external storage apparatus that is removable from the computer apparatus 201, examples of which include an optical disk such as a compact disk (CD), a magnetic or optical card, an IC card, or a memory card. Optical disks include CD-RW, CD-R, DVD-RAM and DVD-RW for example, although the present embodiment will be described in terms of an optical disk simply being a CD-ROM or a DVD-ROM. Note that the internal storage apparatus 304 of the present embodiment stores an operating system and file management application software (described below).

Reference numeral 313 denotes a USB (Universal Serial Bus) interface for connecting to an input device such as a pointing device 203 or a keyboard 204, an image input device 205 such as a digital camera, and an external storage apparatus 206.

Reference numeral 312 denotes a video interface for connecting to a display 202 for displaying data held by the computer apparatus 201 or data supplied from an external apparatus.

Reference numeral 108 denotes a system bus that communicably connects the above elements.

Figure 2:
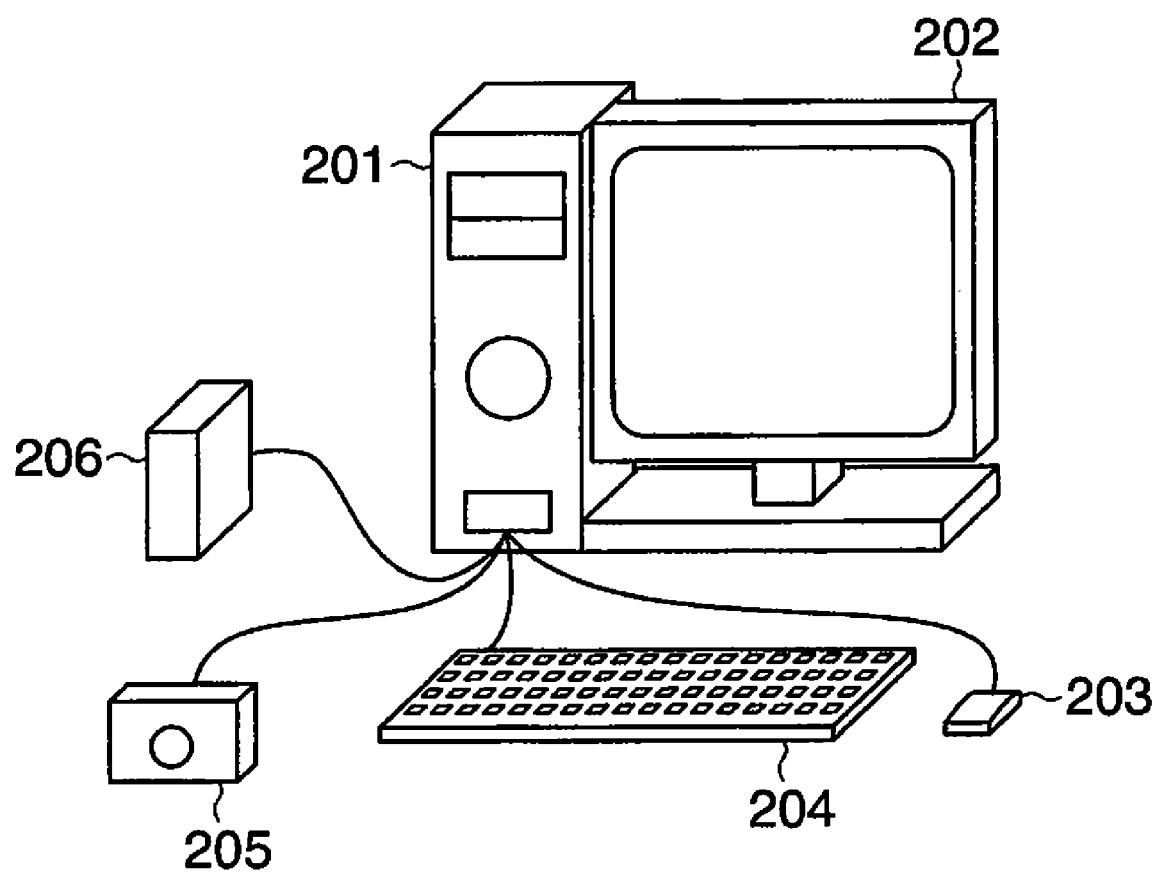
FIG. 2 shows an exemplary overview of the file management system according to the embodiment of the present invention.

FIG. 2 shows an exemplary overview of the file management system of the present embodiment.

In FIG. 2, reference numeral 201 denotes a computer apparatus, and reference numeral 202 denotes a display that displays data and operational states. The file management apparatus of the present embodiment is realized by the computer apparatus 201. Reference numeral 203 denotes a pointing device, and reference numeral 204 denotes a keyboard. Reference numeral 205 denotes an image input device such as a digital camera, an image reader, a video camera, or a scanner. Reference numeral 206 denotes an external storage apparatus that is externally connected to the computer apparatus 201. There may be a plurality of external storage apparatuses 206.

Figure 3:
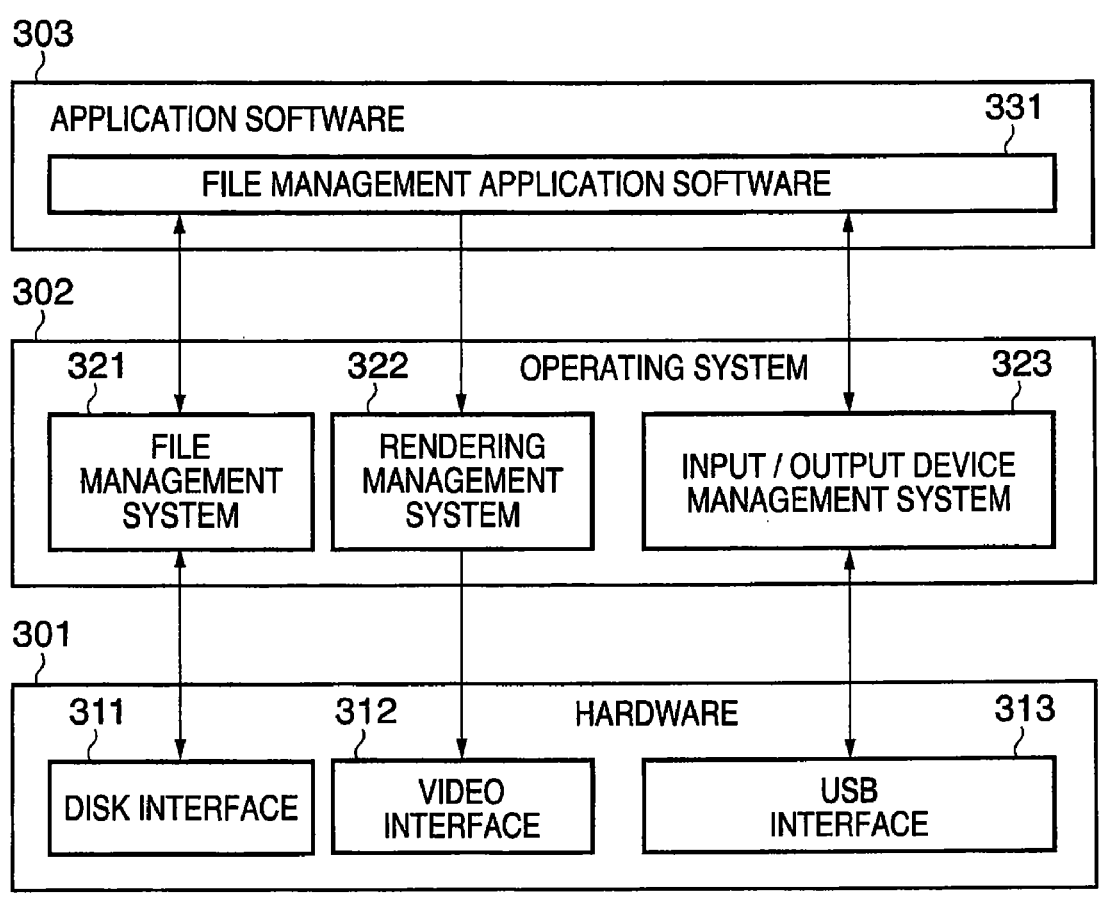
FIG. 3 shows an exemplary configuration including the software and hardware of a computer apparatus according to the embodiment of the present invention.

FIG. 3 shows the configuration of the hardware of the computer apparatus 201 shown in FIG. 2, and the software run by the hardware.

In FIG. 3, reference numeral 301 denotes the hardware of the computer apparatus 201, including the configuration illustrated in FIGS. 1 and 2. The disk interface 311, the video interface 312 and the USB interface 313 are illustrated here.

Reference numeral 302 denotes an operating system that runs on the hardware 301. Reference numeral 303 denotes application software that includes file management application software 331 running on the operating system 302.

Reference numeral 321 denotes a file management system constituting the operating system 302. The file management system 321 is provided with the function of inputting and outputting various files in accordance with instructions from the file management application software 331.

Reference numeral 311 denotes a disk interface for the file management system 321 to perform reading and writing of the internal storage apparatus 304. Reference numeral 322 denotes a rendering management system constituting the operating system 302. The rendering management system 322 is provided with the function of rendering the graphics of various screens in accordance with instructions from the file management application software 331. Reference numeral 312 denotes a video interface for the rendering management system 322 to render graphics on the display 202.

Reference numeral 323 denotes an input/output device management system constituting the operating system 302. The input/output device management system 323 is provided with the function of passing data input by the user using the pointing device 203 and the keyboard 204 and the output of other application software to the file management application software 331. Reference numeral 313 denotes a USB interface that collectively manages the input of the pointing device 203 and the keyboard 204, the input and output of the image input device 205, and the input and output of the external storage apparatus 206 resulting from the input/output device management system 323.

Figure 4:
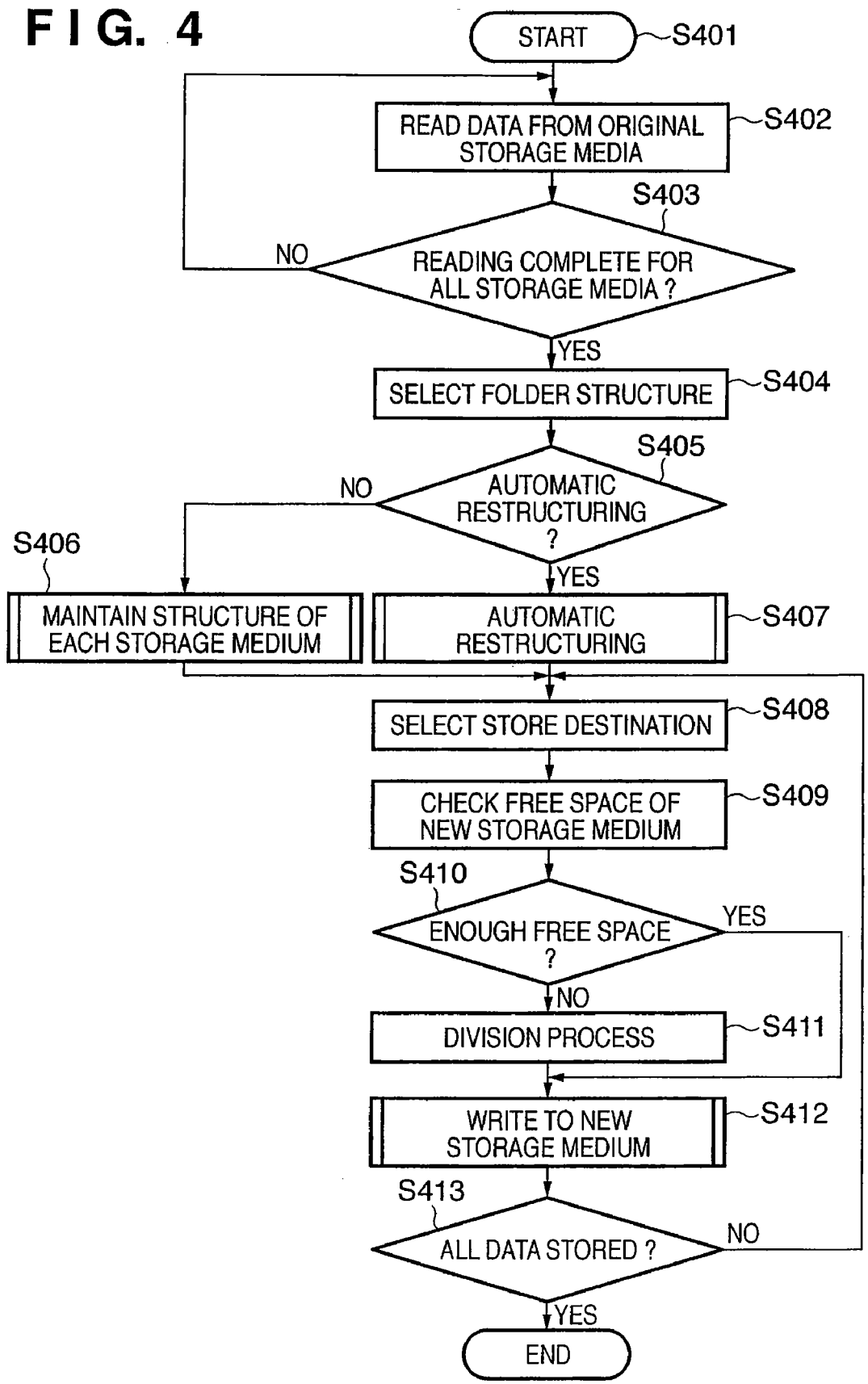
FIG. 4 is a flowchart illustrating the operations of a file management apparatus according to the embodiment of the present invention.

Operations performed by the computer apparatus 201 of the present embodiment to read data from a storage medium such as a CD-ROM (hereinafter, original storage medium or original disk; corresponds to first external storage medium), and record the read data to another storage medium such as a DVD-ROM (hereinafter, new storage medium or new disk) will be described with reference to the flowchart of FIG. 4. The following operation of the computer apparatus 201 are realized as a result of the CPU 101 controlling the constituent elements illustrated in FIG. 1, in accordance with the operating system 302 and the file management application software 331. As such, the CPU 101, in accordance with the file management application software 331, may control the constituent elements of the computer apparatus 201 to include within the computer apparatus 201 a "reading processor" and a "storage control processor" whose functionality will also be described with reference to the flowchart of FIG. 4. In the present embodiment, "data" is described in terms of being image files.

In step S401, the processing is started by the computer apparatus 201 running the file management application software 331.

Figure 5:
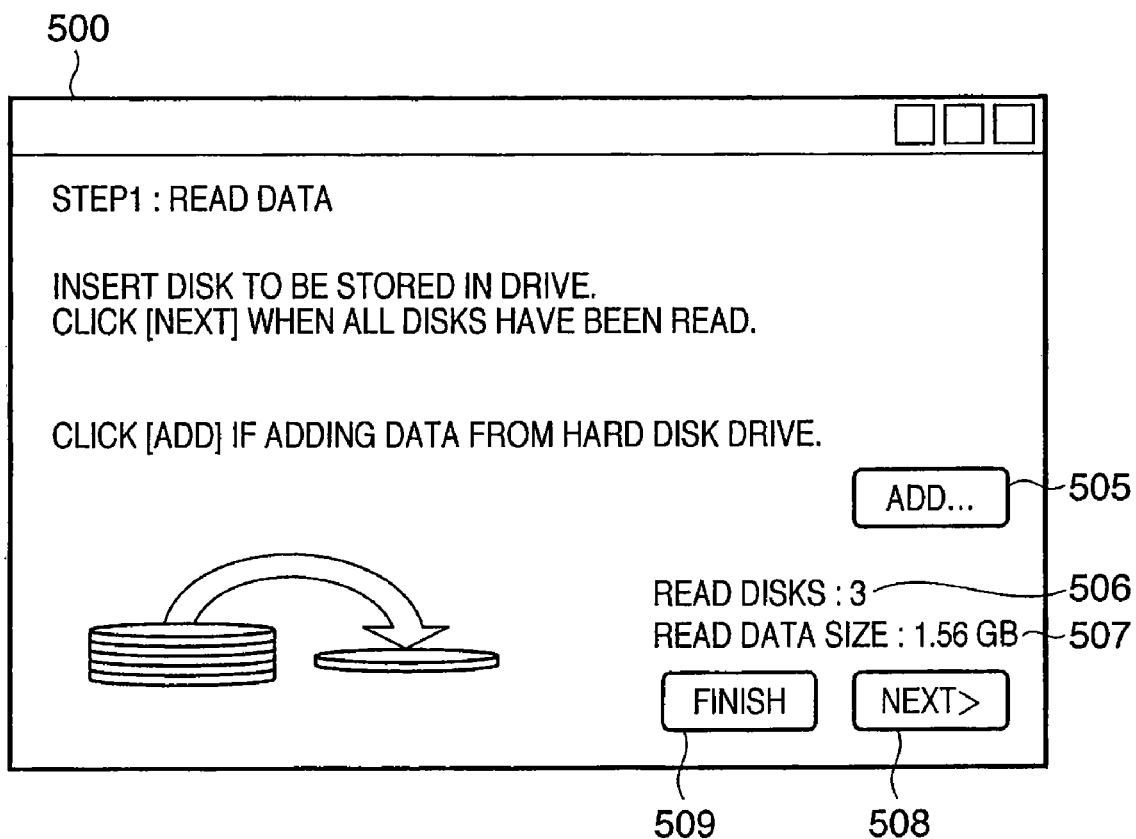
FIG. 5 shows an exemplary data reading screen according to the embodiment of the present invention.
Figure 6:
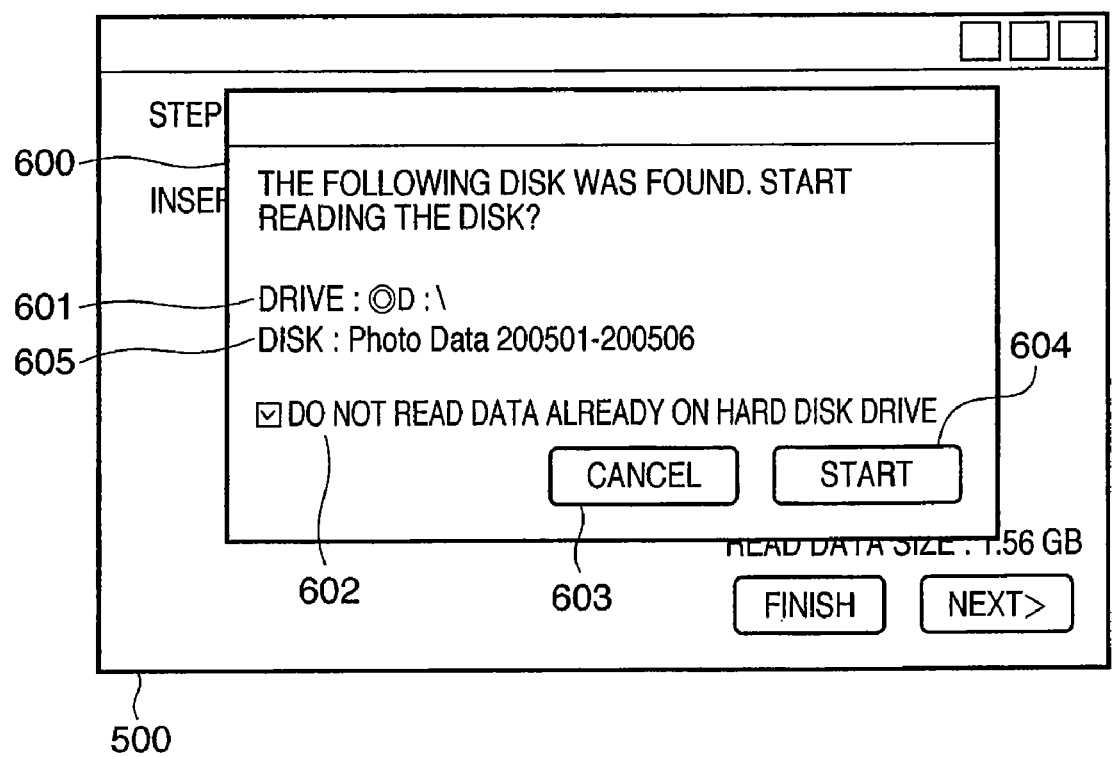
FIG. 6 shows an exemplary dialog screen according to the embodiment of the present invention.

In step S402, computer apparatus 201, or the CPU 101 within the computer apparatus 201 acting as the reading processor, executes a process of reading image files from original storage media. In step S402, the computer apparatus 201 firstly displays a data screen 500 such as shown in FIG. 5 on the display 202. The computer apparatus 201 then displays a dialog screen 600 such as shown in FIG. 6 on the display 202 when an original storage medium has been inserted into the external apparatus 206. The user determines whether or not to start the reading of the image files from the inserted original storage medium.

A drive name 601 of the external storage apparatus 206 and a disk title 605 of the inserted original storage medium are displayed on the dialog screen 600. The user is able to confirm that the original storage medium which s/he wants to read is inserted into the external storage apparatus 206 by checking the drive name 601 and the disk title 605. If the original storage medium that s/he wants to read is inserted into the external storage apparatus 206, the user inputs an instruction to the computer apparatus 201 to start the reading process by clicking a Start button 604 using the pointing device 203. If a different original storage medium is inserted into the external storage apparatus 206, the user inputs an instruction to the computer apparatus 201 to cancel the reading of that original storage medium by clicking a Cancel button 603.

The computer apparatus 201 reads image files from the original storage medium inserted into the external storage apparatus 206 in response to input of the reading start instruction, and stores the read image files in the internal storage apparatus 304. If the computer apparatus 201 was able to read all of the image files from the original storage medium inserted into the external storage apparatus 206 and store the read files without error, the fact that reading of the inserted original storage medium is complete is displayed on a dialog screen. Then, when the user inserts another original storage medium into the external storage apparatus 206, the computer apparatus 201 similarly executes the reading process. In this way, image files read from a plurality of original storage media are accumulated in the internal storage apparatus 304. Further, a structure list showing the hierarchy structure of folders into which the image files have been sorted is also recorded on each original storage medium. The computer apparatus 201 also reads these structure lists from the original storage media and stores the read structure lists in the internal storage apparatus 304. Structure lists will be discussed below with reference to FIG. 13.

The user is also able to designate image files stored in the internal storage apparatus 304 as data to be read, by clicking an Add button 505 shown in FIG. 5 using the pointing device 203.

Note that the number of original storage media that have been read (506: "Read disks") and the total size of image files read from the original storage media and image files in the internal storage apparatus 304 designated by the user (507: "Read data size") are displayed on the data reading screen 500.

In step S403, the computer apparatus 201 checks whether the reading process has been completed for all of the original storage media. Specifically, when the reading process has been completed for all of the original storage media to be read, the user clicks a Next button 508 using the pointing device 203 to input a reading completion notification to the computer apparatus 201. The computer apparatus 201 proceeds to step S404 if the reading process has been completed for all of the storage media. Otherwise, the computer apparatus 201 returns to step S402.

In step S404, the computer apparatus 201 selects a folder structure for when the image files are recorded to a new storage medium (corresponds to second external storage medium).

Figure 7:
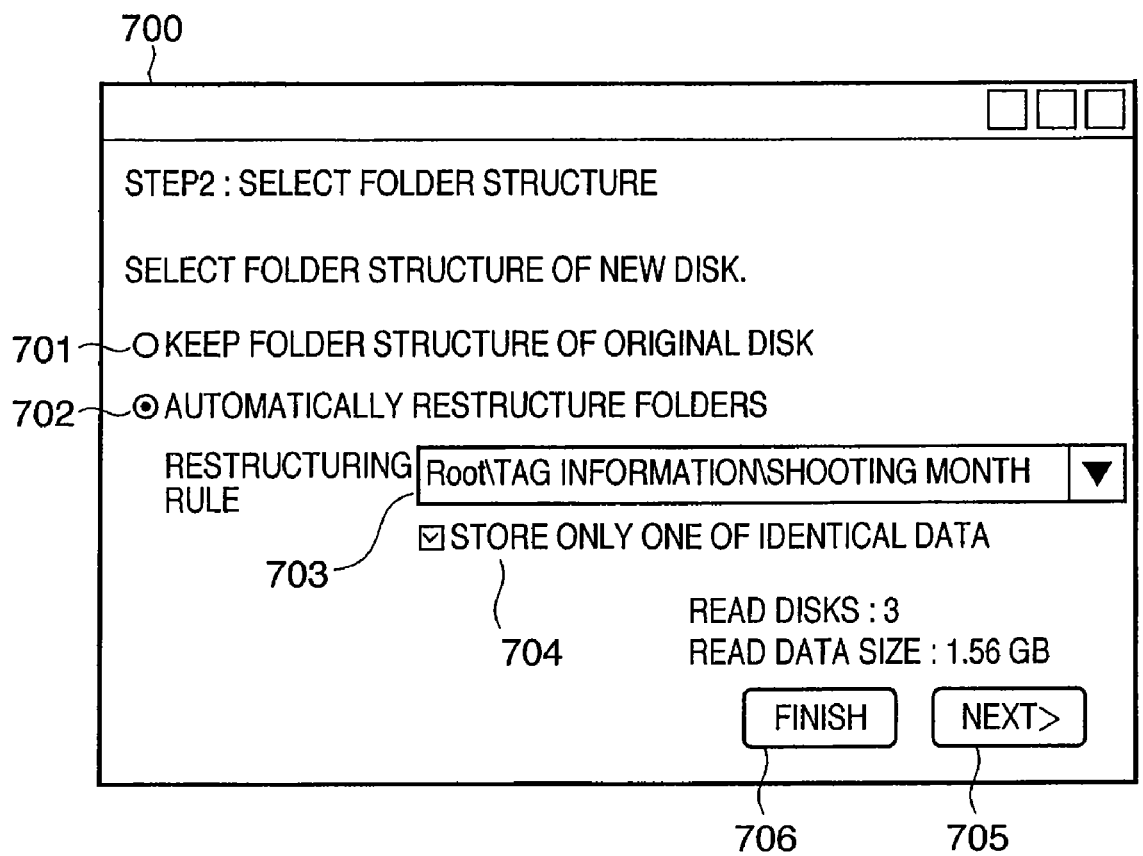
FIG. 7 shows an exemplary folder structure selection screen according to the embodiment of the present invention.

The computer apparatus 201 prompts the user to select a folder structure by displaying a folder structure selection screen 700 as shown in FIG. 7 on the display 202. Reference numeral 701 and 702 denote radio buttons for inputting a folder structure selection. If the user selects the radio button 701, the computer apparatus 201 records image files to the new storage medium while maintaining the folder structure of the original storage media.

On the other hand, if the user selects the radio button 702, at least one type of attribute information and a folder hierarchy corresponding thereto is designated using a pull-down menu 703. Then, in accordance with the designated restructuring rule, the computer apparatus 201 restructures the folders, and records the image files to the new storage medium after having automatically resorted the image files into the folders.

Note that the user clicks a Finish button 706 when s/he wants to interrupt the processing.

When the user clicks a Next button 705, the computer apparatus 201 in step S405 checks whether the user in step S404 selected to automatically restructure the folders or to maintain existing folder structures. If the user selected to maintain existing folder structures, the computer apparatus 201 proceeds to step S406. On the other hand, if the user selected to automatically restructure the folders, the computer apparatus 201 proceeds to step S407.

The computer apparatus 201, or the CPU 101 within the computer apparatus 201 acting as a storage control processor, in accordance with the user selection, creates a structure list in steps S406 or 5407 showing the association of files with folders.

In step S406, the computer apparatus 201 acquires the structure lists of the original storage media stored in the internal storage apparatus 304 in step S402, and newly creates a structure list that maintains the existing associations between files and folders in the acquired structure lists.

Figure 10:
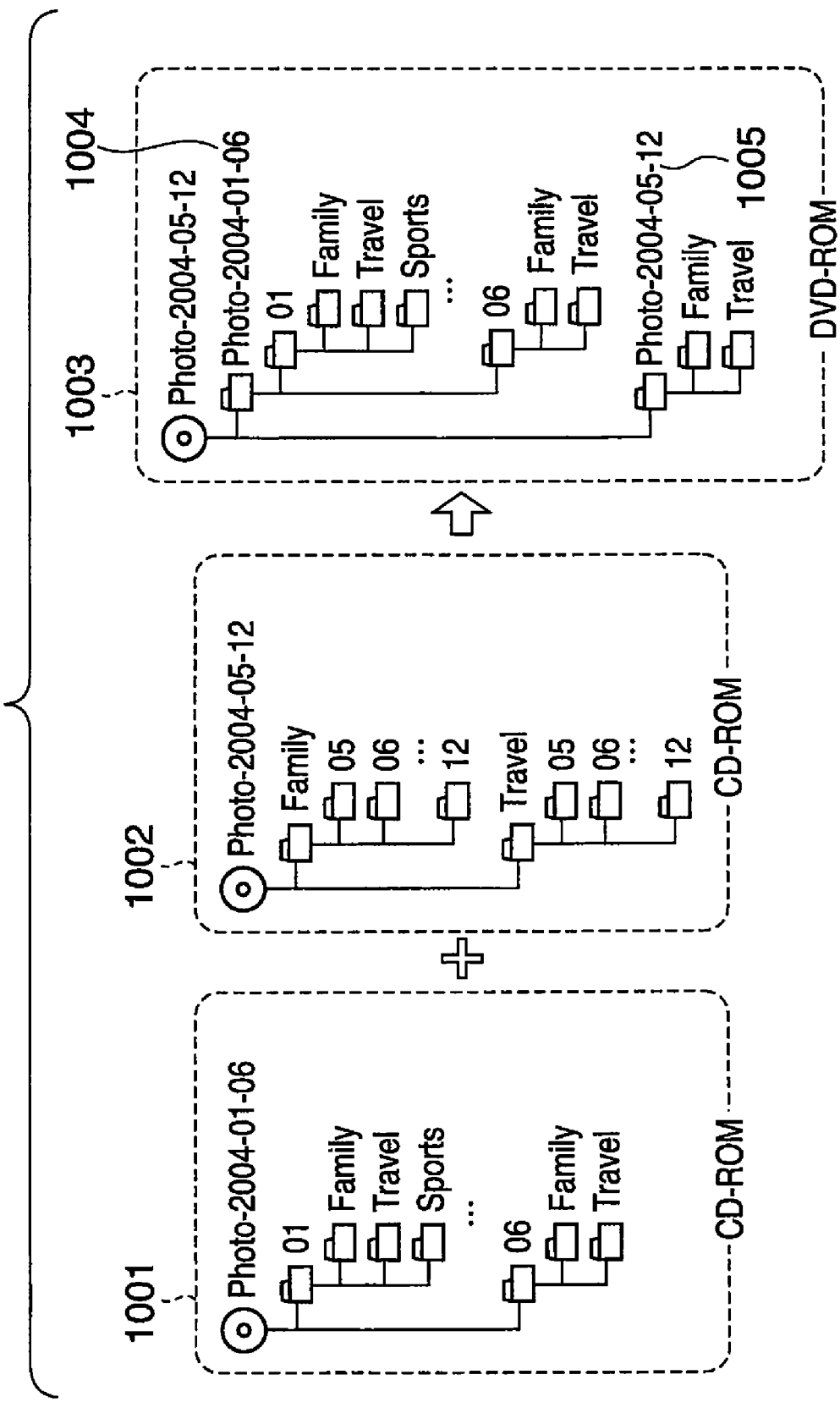
FIG. 10 shows exemplary folder structures of original storage media and a new storage medium according to the embodiment of the present invention.

As shown in FIG. 10, for example, the computer apparatus 201 creates a structure list so that image files are written to a DVD-ROM 1003 while maintaining the folder structures of CD-ROMs 1001 and 1002. That is, in the DVD-ROM 1003, a folder 1004 at the first hierarchy level has the same disk title as the CD-ROM 1001, and the folder structure from the second hierarchy level down is the same as that in the CD-ROM 1001. The same applies to the CD-ROM 1002 and a folder 1005 of the DVD-ROM 1003.

Figure 11:
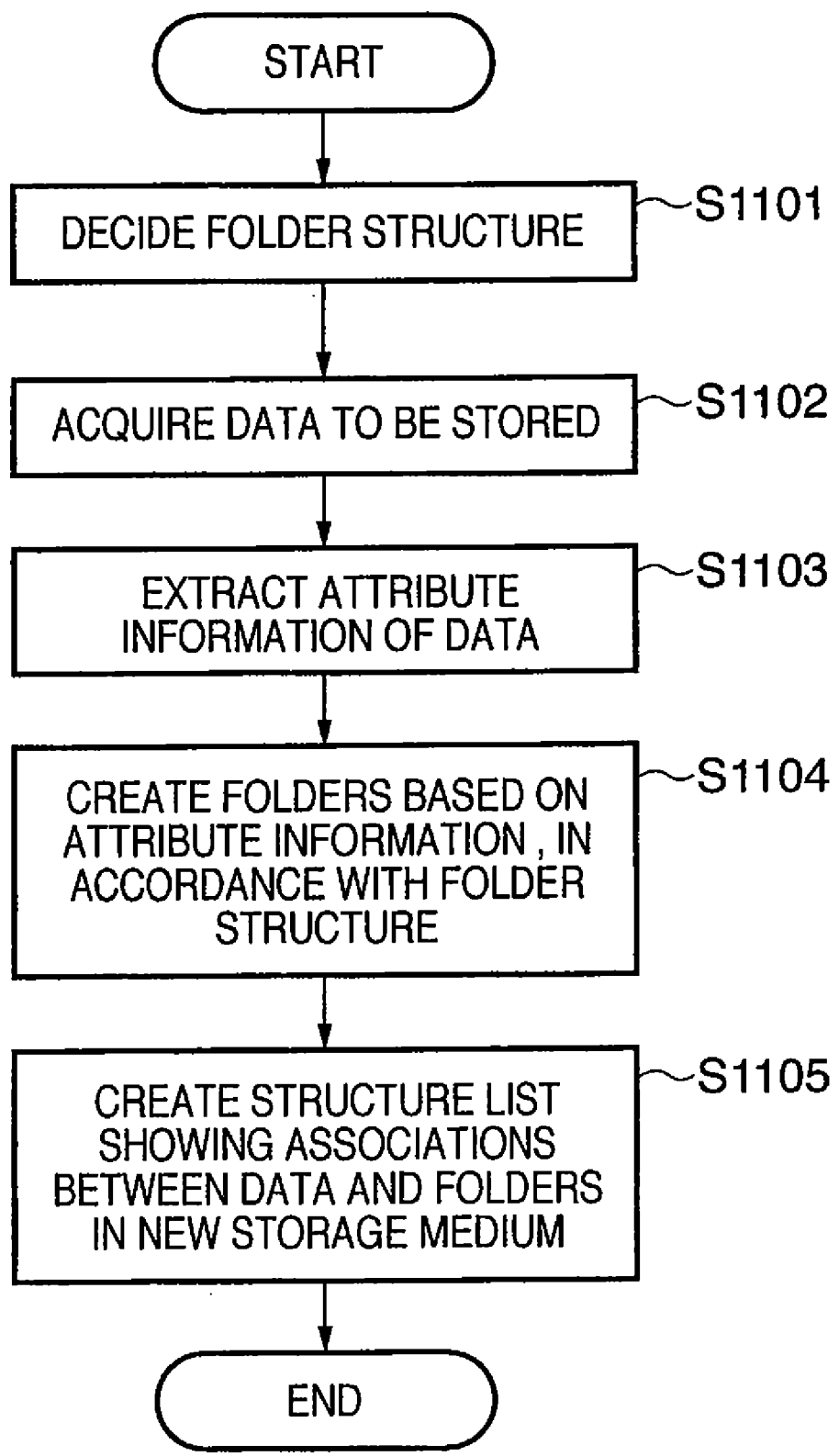
FIG. 11 is a flowchart illustrating the operations of the file management apparatus according to the embodiment of the present invention.

The processing in step S407 will be discussed below with reference to FIG. 11.

In step S408, the computer apparatus 201 then selects a new storage medium.

Figure 8:
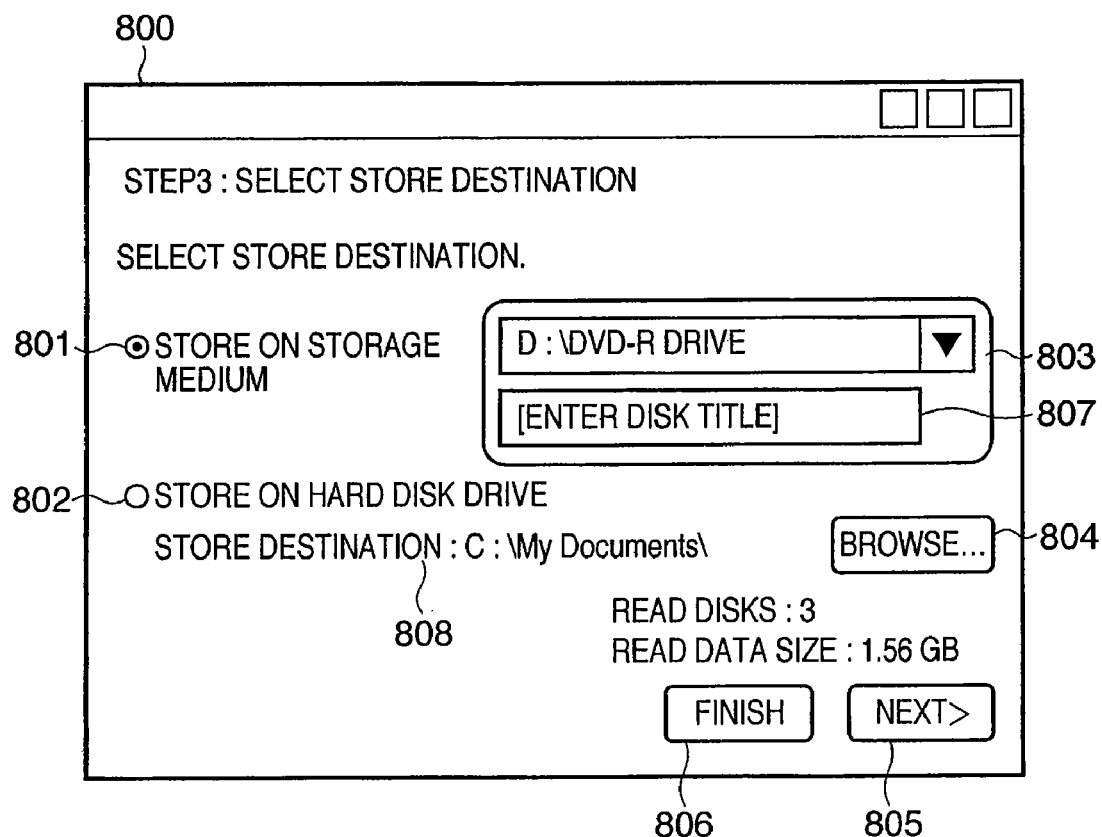
FIG. 8 shows an exemplary store destination selection screen according to the embodiment of the present invention.

The computer apparatus 201 displays a store destination selection screen 800 as shown in FIG. 8 on the display 202.

Reference numerals 801 and 802 in FIG. 8 denote radio buttons for inputting designation of the store destination. If the user selects the radio button 801, the computer apparatus 201 acquires information relating to available external storage apparatuses 206 via the USB interface 313, and displays a list 803. The user chooses an external storage apparatus 206 that s/he wishes to designate as the store destination from the list. Once an external storage apparatus 206 has been selected, a title 807 of a new storage medium that can be written by the selected external storage apparatus 206 is also displayed. On the other hand, if the user selects the radio button 802, the computer apparatus 201 selects a storage area of the internal storage apparatus 304 shown by a file path 808 as the store destination.

Reference numeral 804 denotes a button for designating the file path 808 of the internal storage apparatus 304. If the user wants to store an image file to a new storage medium after the image file has been stored to the internal storage apparatus 304 (storage control), s/he can designate the image file in the internal storage apparatus 304 by clicking on the Add button 505 of the data reading screen 500. The computer apparatus 201 in step S402 thereby accumulates designated image files in the internal storage apparatus 304 as files to be stored.

Once the user has clicked on a Next button 805 to confirm the store destination, the computer apparatus 201 proceeds to the next step S409. Note that the user clicks a Finish button 806 when s/he wants to interrupt the processing.

In the present embodiment, it is assumed that an external storage apparatus 206 has been chosen as the store destination in step S408. When a new storage medium is inserted into the external storage apparatus 206, the computer apparatus 201 in step S409 acquires the free space of the new storage medium. The computer apparatus 201 also calculates the total volume of the plurality of image files to be stored. Then, in step S410, the computer apparatus 201 compares the free space of the new storage medium with the total volume of the plurality of image files, and checks whether the new storage medium has enough free space to record the plurality of image files. The computer apparatus 201 proceeds to step S412 if the new storage medium has enough free space.

In step S412, the computer apparatus 201 sorts the image files into a plurality of folders in accordance with the structure list, and writes the sorted image files to the new storage medium inserted into the external storage apparatus 206. Here, the structure list is also stored to the new storage medium.

Figure 9:
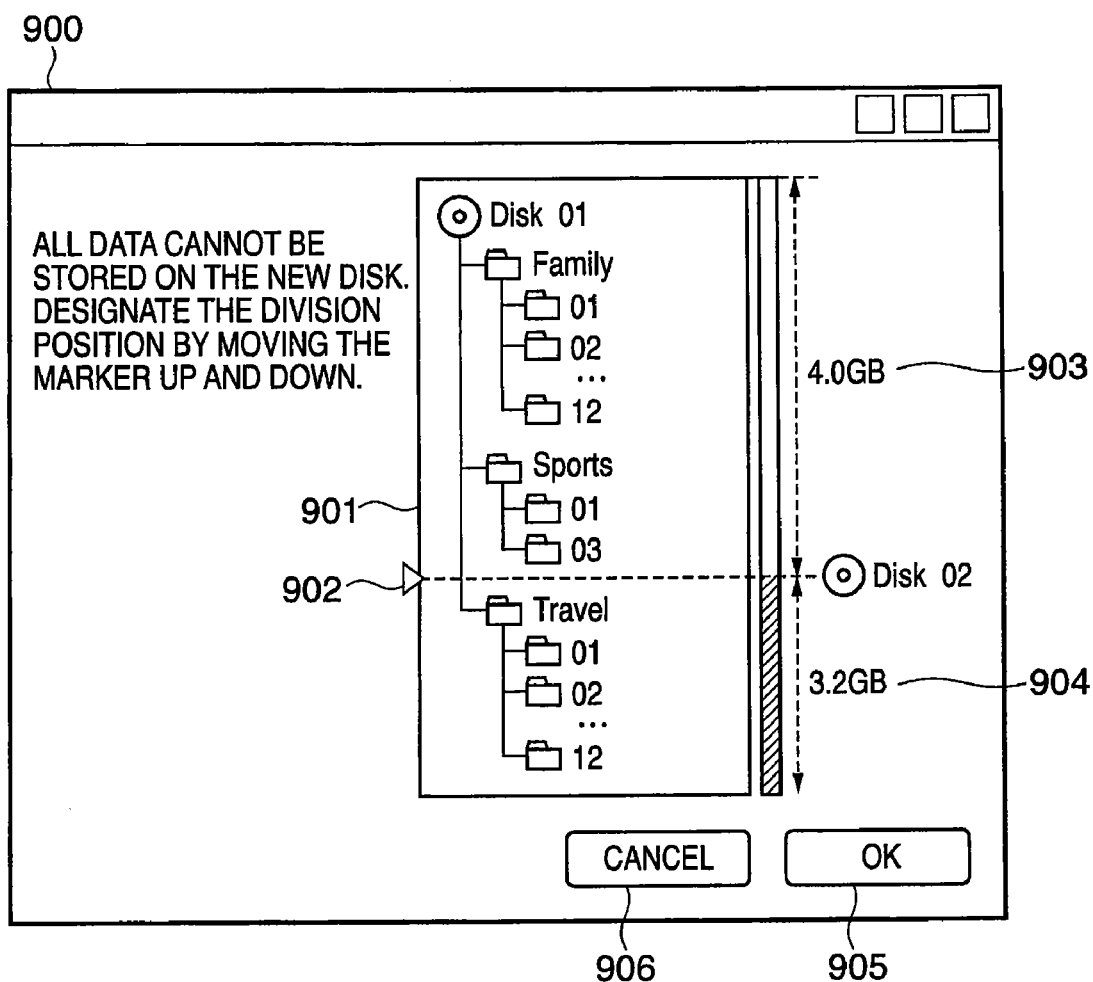
FIG. 9 shows an exemplary division designation screen according to the embodiment of the present invention.

If the new storage medium does not have enough free space, or in other words, if the free space of the new storage medium is less than the total volume of the plurality of image files to be stored, the computer apparatus 201 in step S411 divides the plurality of image files into a plurality of file groups. Firstly, the computer apparatus 201 displays a division designation screen 900 such as shown in FIG. 9 on the display 202.

Reference numeral 901 denotes a tree view representing the folder structure for when image files are recorded to the new storage medium. Reference numeral 902 denotes a marker for designating the division point. The user decides the division point by moving the marker 902 up and down using the pointing device 203. The size of the image files in areas 903 and 904 is also displayed on the division designation screen 900. Note that the marker 902 is restricted so as not to move beyond the point where the total volume of image files in the area 903 exceeds the free space of the new storage medium.

Once the division point has been decided, the user clicks an OK button 905. In response, the computer apparatus 201 divides the plurality of image files at the designated division point, and recreates the structure list by also dividing the structure list based on this division point.

In step S412, the computer apparatus 201, or the CPU 101 within the computer apparatus 201 acting as a storage control processor, sorts the image files into folders in accordance with the structure list for the plurality of image files in the area 903, and writes the sorted files to the new storage medium. The structure list is also stored to the new storage medium. Note that when the user clicks a Cancel button 906, processing is interrupted and display returns to the store destination selection screen 800.

In step S413, the computer apparatus 201 checks whether the plurality of image files to be stored have all been written to the new storage medium. If all the image files have not been written to the new storage medium, the computer apparatus 201 returns to step S408, whereas if all the image files have been stored, the computer apparatus 201 ends the processing. For example, if the image files in the area 904 have not yet to be written, the computer apparatus 201 returns to step S408 and executes the subsequent processing, based on the remaining structure list.

In this way, if a new storage medium does not have enough free space, the plurality of image files accumulated in the internal storage apparatus 304 are stored in a plurality of new storage media after being divided into a plurality of file groups. Even in this case, the number of storage media is reduced if, for example, the computer apparatus 201 is able to read image files recorded on ten CD-ROMs and rerecord the read image files to two DVD-ROMs, thereby enabling the user to organize a plurality of image files in a compact form.

Next, the operations when the computer apparatus 201 performs the automatic restructuring of folders in step S407 will be described with reference to the flowchart of FIG. 11.

Figure 12:
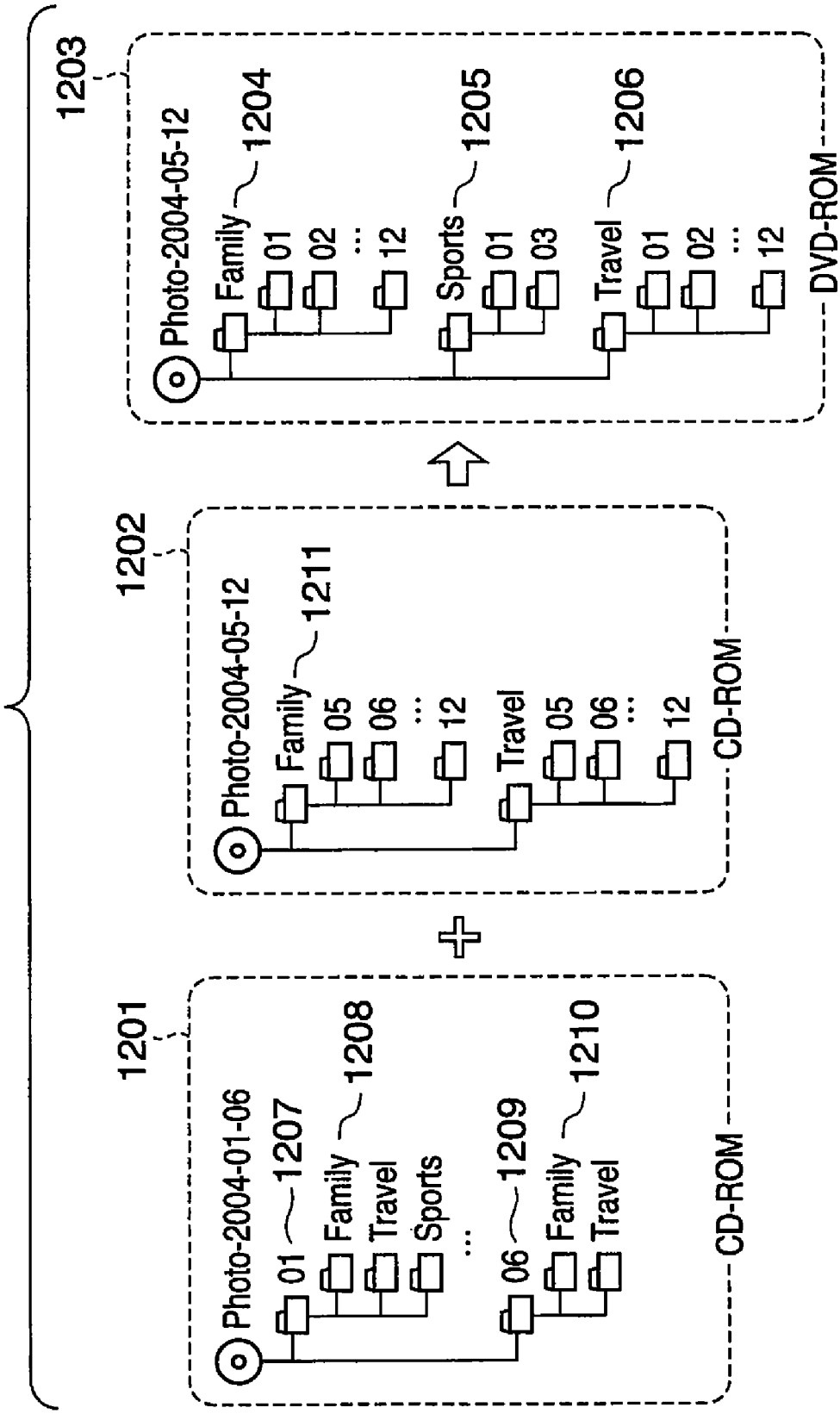
FIG. 12 shows exemplary folder structures of original storage media and a new storage medium according to the embodiment of the present invention.

As shown in FIG. 12, it is assumed that image files are recorded on two CD-ROMs. The attribute information used in the folder structure of the image files recorded on a first CD-ROM 1201 is the shooting month at the first hierarchy level and event tags at the second hierarchy level. On the other hand, the attribute information used in the folder structure of the image files recorded on a second CD-ROM 1202 is event tags at the first hierarchy level and the shooting month at the second hierarchy level. That is, the folder structures of the original storage media differ from each other.

In step S1101, the computer apparatus 201 decides the folder structure in a DVD-ROM 1203 constituting the new storage medium, in accordance with the restructuring rule selected via the folder structure selection screen 700. Here, it is assumed that folders based on event tags at the first hierarchy level and folders based on the shooting month at the second hierarchy level has been selected as the restructuring rule.

Here, procedures performed by the computer apparatus 201 to create options for the pull-down menu 703 of the folder structure selection screen 700 will be described. Firstly, the computer apparatus 201 reads the structure lists of the original storage media from the internal storage apparatus 304, and detects the attribute information used in the respective folder hierarchies. The computer apparatus 201 then displays the folder structures of the original storage media in pull-down menu 703 as the restructuring rule options. In the case shown in FIG. 12, for example, "\shooting month\event tag" and "\event tag\shooting month" would be displayed in pull-down form as the two options. Then, in response to a user operation, the computer apparatus 201 selects a folder structure from the options displayed in pull-down form.

Note that option candidates may be preset in the file management application software, and added to the options. For example, a folder structure such as "\camera model\shooting mode" may be added as a candidate.

Alternatively, attribute information of image files may be preset in the file management application software, and added to the folder structures of the original storage media. For example, a further hierarchy level of preset attribute information may be added above the folder structures of the original storage media, making options such as "\camera model\shooting month\event tag" or "\camera model\event tag\shooting month" conceivable.

Also, rather than manually selecting from the options in the pull-down menu 703 in response to a user operation, a folder structure may be selected automatically in accordance with preset conditions in the file management application software. The order in which the original storage media are read may be given as a condition. In this case, the folder structure of the first original storage medium to be read, for example, is automatically selected. Alternatively, the number of folders existing at a prescribed hierarchy level may also be given as a condition. In this case, the folder structure having the smallest number of folders at the top hierarchy level, for example, is automatically selected. In the case of FIG. 12, the folder structure of the first CD-ROM 1201 has twelve folders 1 to 12 since the top hierarchy level is the shooting month. On the other hand, the folder structure of the second CD-ROM 1202 has three folders "Family", "Travel" and "Sports", since the top hierarchy level is event tags. Consequently, the folder structure "\event tag\shooting month" of the second CD-ROM 1202 would be automatically selected.

In step S1102, the computer apparatus 201 acquires the plurality of image files to be stored that have been read from the first and second CD-ROMs 1201 and 1202 (the original storage media) in step S402 and stored in the internal storage apparatus 304.

In step S1103, the computer apparatus 201 extracts attribute information of the image files acquired in step S1102, such as shooting date/time information and comment information. In the present embodiment, the image files are in Exif (exchangeable image file format) format, and attribute information relating to the shooting is recorded as metadata. The attribute information includes at least one of camera model information, shooting parameters, shooting date/time information, shooting mode information, event tag information, and text information arbitrarily input by the user, for example. Shooting modes are modes in which shooting parameters tailored to specific scenes have been preset, examples of which include night scene mode, landscape mode and portrait mode.

Next, in step S1104, the computer apparatus 201, in accordance with the folder structure decided in step S1101, creates new folders based on the shooting month included in the shooting date/time information and the types of events included in the event tag information, out of the attribute information extracted in step S1103.

Then, in step S1105, the computer apparatus 201 associates the image files acquired in step S1102 with the folders created in step S1104, based on the attribute information of the image files, and creates a structure list showing these associations.

In FIG. 12, for example, image files in the first CD-ROM 1201 whose shooting month is "01" are associated with a folder 1207, and of these, image files whose event tag is "Family" are associated with a folder 1208. Also, image files in the first CD-ROM 1201 whose shooting month is "06" are associated with a folder 1209, and of these, image files whose event tag is "Family" are associated with a folder 1210. Similarly, image files in the second CD-ROM 1202 whose event tag is "Family" are associated with a folder 1211, and then with respective shooting month folders. The computer apparatus 201 in step S1105 associates these image files with a "Family" folder 1204 in the DVD-ROM 1203 and also with the respective shooting month folders, and creates a structure list showing these associations.

It should be noted that the present embodiment is described under the assumption that each image file has a single event tag. However, the image file is not limited to only one event tag. In this case, for example, it is possible to add up all of the event tags of the image files, and create a folder by selecting several event tags at the top of an ordered list of the event tags. Moreover, it is possible to create an "others" folder, and associate image files, which do not have event tags at the top of the ordered list of the event tags, with the "others" folder.

FIG. 13 is an exemplary structure list written in XML (extensible Markup Language). Reference numeral 1301 denotes the title of the storage medium. The title of the storage medium is assumed, for example, to consist of the created date/time appended to a volume label. In the case of the structure list in FIG. 13, the image file "IMG_001.jpg" is associated with a "Family" folder 1302 at the first hierarchy level, and with a "200606" folder 1303 at the second hierarchy level. In the example given in the present embodiment, image files are associated with folders at the second hierarchy level, although image files may be associated with folders at two or more hierarchy levels.

The structure list records a filename 1304, a path 1305 of the image file in the internal storage apparatus 304, and a file type 1306. Note that while the image file in FIG. 13 has been stored to the internal storage apparatus 304, if the image file was stored to another external storage medium or the like, the path of that storage medium would be recorded in the structure list. Additionally, the file size and the capacity of the storage medium may also be recorded in the structure list. Note that the information need not all be recorded in the structure list before writing image files to the storage medium. Some of the information may be recorded afterwards. For example, the title and total capacity of the storage medium may be recorded after image files have been written to the storage medium.

Also, while not shown in the drawings, the folder structure of the storage medium is described in the structure list. That is, the attribute information of the image files for sorting the hierarchy levels is described in the structure list. In the case of FIG. 13, for example, the fact that the first hierarchy level is the "event tag information" of image files and the second hierarchy level is the "shooting date/time information" of image files is described in the structure list.

Figure 14:
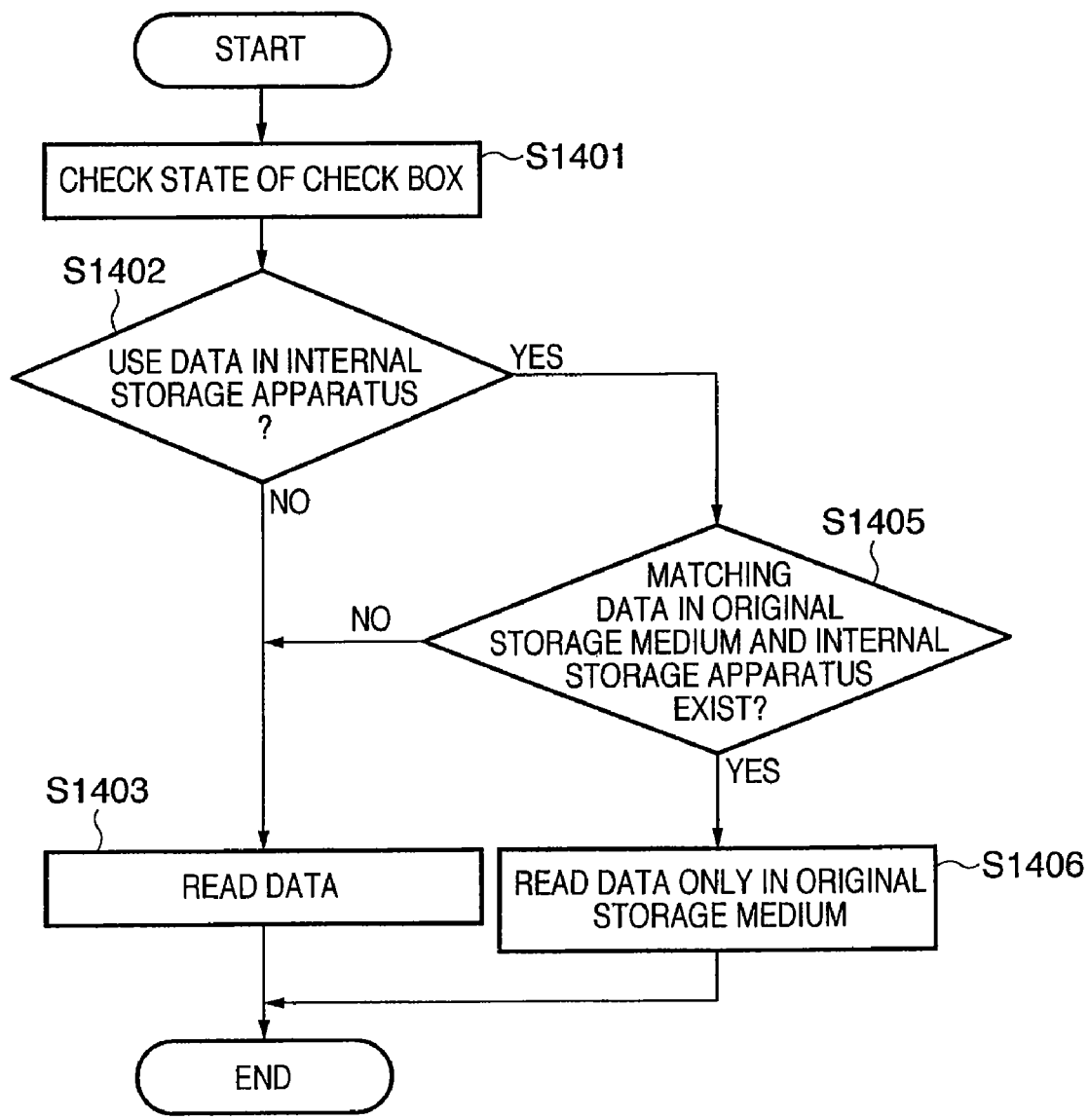
FIG. 14 is a flowchart illustrating the operations of the file management apparatus according to the embodiment of the present invention.
Figure 15:
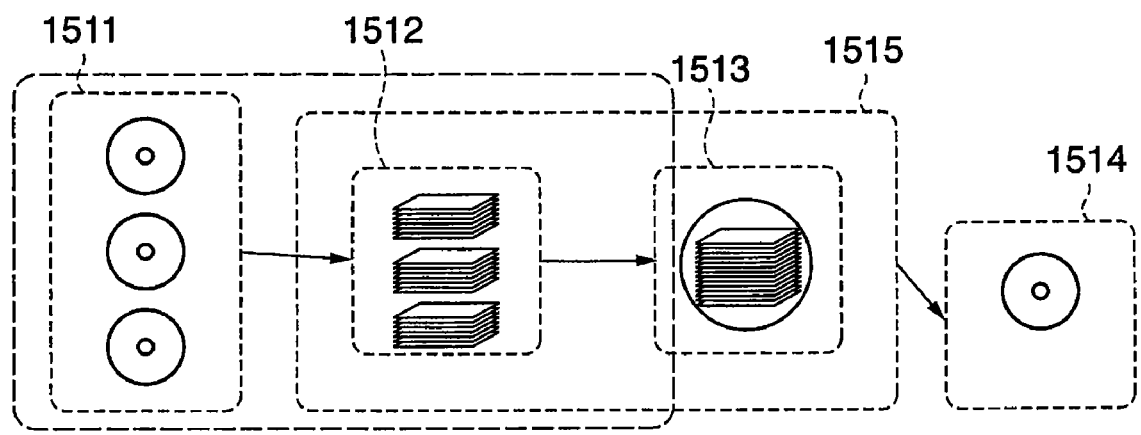
FIG. 15 illustrates procedures for copying data between storage media according to the prior art.

By creating structure lists such as that above and recording the structure lists in respective storage media, the computer apparatus 201 is able to use the structure lists in processing described below with reference to FIG. 14.

Note that in terms of the folder restructuring rule, folders may be structured based on the created date/time of files instead of the shooting date/time. Folders may also be structured using attribute information of the image files held by the file management application software, such as "keyword" or "my rating" (importance). Further, face recognition may be implemented in relation to image files, and folders may be structured for individual people using the results of the facial recognition.

In the present embodiment, the image files of original storage media are automatically associated with new folders created in accordance with the new rule. The considerable work involved in organizing image files that was required of the user when writing image files on a plurality of original storage media to a new storage medium can thereby be reduced.

Note that a list similar to the foregoing structure list may be created when reading image files from original storage media.

Next, processing in the case where a check box 602 of the dialog screen 600 in FIG. 6 is on will be described with reference to the flowchart of FIG. 14. Reference numeral 602 in FIG. 6 denotes a check box for instructing that image files in the internal storage apparatus 304 be used, in the case where image files on original storage media also already exist in the internal storage apparatus 304. If the same image file as an original storage medium already exists in the internal storage apparatus 304, processing time can be shortened since the need to read image files from the original storage medium is removed by using the image file in the internal storage apparatus 304.

When the user clicks on the Start button 604 in FIG. 6, the computer apparatus 201 starts the processing. In step S1401, the computer apparatus 201 checks the on/off state of the check box 602. The computer apparatus 201 proceeds to step S1403 if it is determined that the check box 602 is off. In step S1403, the computer apparatus 201 starts reading all of the image files on the original storage medium. On the other hand, the computer apparatus 201 proceeds to step S1405 if it is determined that the check box 602 is on. In step S1405, the computer apparatus 201 determines whether any of the image files on the original storage medium are in the internal storage apparatus 304, based on information in the structure list recorded on the original storage medium. If not, the computer apparatus 201 proceeds to step S1403. On the other hand, if there are such files, the computer apparatus 201 proceeds to step S1406. In step S1406, the computer apparatus 201 then reads the image files that are only on the original storage medium, without reading the image files that are also in the internal storage apparatus 304. The computer apparatus 201 ends the processing when the reading process is complete. The computer apparatus 201 then updates the number of read original storage media (506: "Read disks") and the total size of read image files (507: "Read data size"), and displays the data reading screen 500 on the display 202.

Note that a check box 704 of the folder structure selection screen 700 in FIG. 7 is for the user to designate processing to be performed in the case where the same image files are associated with the same folder when the folders have been automatically restructured. If the same image files have been associated with the same folder when it is determined that the check box 704 is on, the computer apparatus 201 writes one of the image files to the new storage medium. The computer apparatus 201 compares the created date/time, the last update date/time and the file size of the image files associated with the same folder, and determines that the image files are the same if this data coincides. When it is determined that the image files are the same but the filenames are different, the computer apparatus 201 notifies the user of this fact with a confirmation dialog box, and prompts the user to decide whether to store the image file using one of the existing filenames or whether to assign a new filename.

Alternatively, if the image files have been recorded on the original storage media using the file management application software 331, the original storage media will have a structure list, thereby enabling the computer apparatus 201 to determine whether image files are the same by collating the structure lists. In this case, processing can be performed faster than the former determination process.

On the other hand, if it is determined that the check box 704 is off, the computer apparatus 201 stores all of the image files without performing these checks. Also, in the case of image files with the same filename, the computer apparatus 201 stores the image files after changing the filenames by attaching sequential numbers to the existing filenames, for instance.

Note that while the present embodiment has been described with image files given as an example of data, the present invention is not limited to this configuration and can be similarly realized with data such as music files or document files. Further, a plurality file types may exist on a single storage medium. In this case, file types may be identified with the file extensions, and folders such as "music files", "image files", and "document files" may be structured based on the identified file types. Further, the attribute information may include created date/time information instead of or in addition to shooting date/time information.

Other Embodiments

The object of the preferred embodiment is also achieved by the following methods. That is, a computer-readable storage medium (or recording medium) recording the program code of software that realizes the functions of the foregoing embodiment is supplied to a system or apparatus. A computer (or CPU, MPU) in the system or apparatus then reads and executes the program code stored on the storage medium. In this case, the actual program code read from the storage medium realizes the functions of the foregoing embodiment, and the storage medium storing this program code constitutes the present invention.

The functions of the foregoing embodiment are not only realized by a computer executing the read program code. The following case is also covered by the present invention. That is, an operating system or the like running on a computer performs part or all of the actual processing based on instructions in the program code, with the functions of the above embodiment being realized as a result of this processing.

Further, the following case is also covered by the present invention. That is, the program code read from the storage medium is written to a memory provided in a function expansion card inserted into a computer or a function expansion unit connected to a computer. A CPU or the like provided in the function expansion card or the function expansion unit then performs part or all of the actual processing based on instructions in the program code, with the functions of the above embodiment being realized as a result of this processing. Where the present invention is applied to the foregoing storage medium, program code corresponding to the procedures described above is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-281736, filed Oct. 16, 2006, and 2007-231883, filed on Sep. 6, 2007, which are hereby incorporated by reference herein in their entirety.

What is claimed is:

1. A file management apparatus for communicating with an external storage medium, wherein the external storage medium has a folder structure in which respective hierarchical levels of the folder structure are assigned a different type of attribute information and wherein files are sorted and stored in folders of the folder structure based on their attribute information, the apparatus comprising:

original external storage media;

a reading processor which reads a plurality of files from a plurality of original external storage media, wherein the plurality of the original external storage media respectively have folder structures which are different from each other such that the same hierarchical level of respective folder structures are assigned different type of the attribute information;

an analyzing processor which analyzes, for the respective folder structures of the plurality of original external storage media, types of attribute information which are assigned to the respective hierarchical levels;

a selecting unit which selects one of the folder structures of the plurality of original external storage media based on an analysis result by the analyzing processor;

a storage control processor which executes control of sorting, based on the attribute information of each file, the plurality of files read by the reading processor in accordance with the types of attribute information assigned to the respective hierarchical levels of the folder structure of the original external storage medium selected by the selecting unit, and executes control of storing the sorted files in a new storage medium;

a writing unit which writes the plurality of files stored in the new storage medium to another external storage medium;

an obtaining unit which obtains a free space of the other external storage medium;

a calculating unit which calculates a total volume of the plurality of files stored on the new storage medium;

a comparing unit which compares the free space with the total volume; and a dividing unit which divides the plurality of files into a plurality of file groups, if a result of the comparison by the comparing unit shows that the free space is less than the total volume, wherein the writing unit writes one of the plurality of file groups obtained by division by the dividing unit to the other external storage medium.

2. The file management apparatus according to claim 1, wherein each of the plurality of files is an image file, and the type of the file attribute information includes at least one of camera model information, a shooting parameter, shooting date/time information, shooting mode information, event tag information, text information, and created date/time information.

3. A control method for a file management apparatus which is communicated with an external storage medium, wherein the external storage medium has a folder structure in which respective hierarchical levels of the folder structure are assigned a different type of attribute information and wherein files are sorted and stored in folders of the folder structure based on their attribute information, the method comprising the steps of:

reading a plurality of files from a plurality of original external storage media, wherein the plurality of original external storage media respectively have folder structures which are different from each other such that the same hierarchical level of respective folder structures are assigned different type of the attribute information;

analyzing, for the respective folder structures of the plurality of original external storage media, types of attribute information which are assigned to the respective hierarchical levels;

selecting one of the folder structures of the plurality of original external storage media based on an analysis result by the analyzing step;

sorting, based on the attribute information of each file, the plurality of files read in the reading step in accordance with the types of attribute information assigned to the respective hierarchical levels of the folder structure of the original external storage medium selected in the selecting step, and executes control of storing the sorted files in a new storage medium;

writing the plurality of files stored in the new storage medium to another external storage medium;

obtaining a free space of the other external storage medium;

calculating a total volume of the plurality of files stored on the new storage medium;

comparing the free space with the total volume; and dividing the plurality of files into a plurality of file groups, if a result of the comparison by the comparing unit shows that the free space is less than the total volume, wherein the writing unit writes one of the plurality of file groups obtained by division by the dividing unit to the other external storage medium.

4. A non-transitory computer-readable storage medium having recorded thereon a computer program that causes a computer which is communicated with an external storage medium, wherein the external storage medium has a folder structure in which respective hierarchical levels of the folder structure are assigned a different type of attribute information and wherein files are sorted and stored in folders of the folder structure based on their attribute information, the apparatus to function as:

a reading unit which reads a plurality of files from a plurality of original external storage media, wherein the plurality of original external storage media respectively have folder structures which are different from each other such that the same hierarchical level of respective folder structures are assigned different type of the attribute information;

an analyzing unit which analyzes, for the respective folder structures of the plurality of original external storage media, types of attribute information which are assigned to the respective hierarchical levels;

a selecting unit which selects one of the folder structures of the plurality of original external storage media based on an analysis result by the analyzing unit;

a storage control unit which executes control of sorting, based on the attribute information of each file, and the plurality of files read by the reading unit in accordance with the types of attribute information assigned to the respective hierarchical levels of the folder structure of the original external storage medium selected by the selecting unit, and executes control of storing the sorted files in a new storage medium;

a writing unit which writes the plurality of files stored in the new storage medium to another external storage medium;

an obtaining unit which obtains a free space of the other external storage medium;

a calculating unit which calculates a total volume of the plurality of files stored on the new storage medium;

a comparing unit which compares the free space with the total volume; and a dividing unit which divides the plurality of files into a plurality of file groups, if a result of the comparison by the comparing unit shows that the free space is less than the total volume, wherein the writing unit writes one of the plurality of file groups obtained by division by the dividing unit to the other external storage medium.

* * * * *